July 1, 1941. WOLF-DIETRICH BENSINGER ET AL 2,247,984
PACKING FOR ROTARY VALVES IN INTERNAL COMBUSTION ENGINES
Filed June 2, 1939
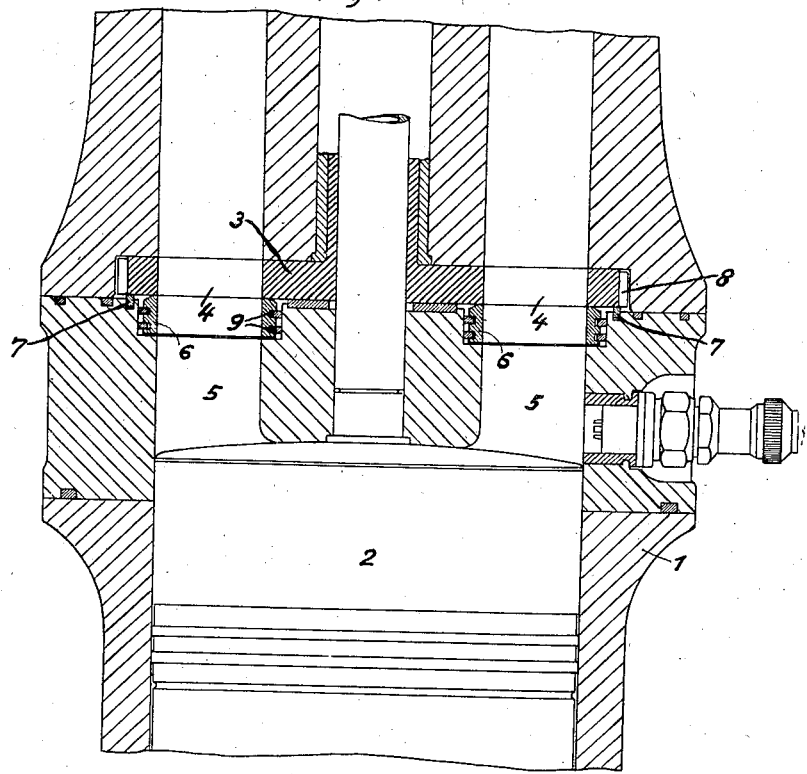
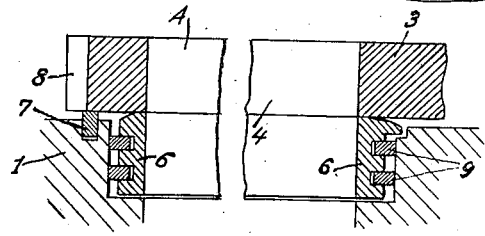
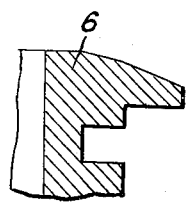
INVENTORS
WOLF-DIETRICH BENSINGER
ROHDOLF JANSEN, OTTO WETZOLD
by their attorneys Patented July 1, 1941

2,247,984

UNITED STATES PATENT OFFICE 2,247,984

PACKING FOR ROTARY VALVES IN INTERNAL COMBUSTION ENGINES

Wolf - Dietrich Bensinger, Berlin - Adlershof, Rohdolf Jansen, Berlin-Johannisthal, and Otto Wetzold, Berlin-Adlershof, Germany Application June 2, 1939, Serial No. 277,102
In Germany May 20, 1938

7 Claims. (Cl. 123—80)

This invention relates to valve packing for internal combustion engines having disc-shaped rotary valves and it has reference, in particular, to packings interposed between such disc-shaped valves and the engine casing.

Already numerous suggestions have been made in regard to packings for the disc-shaped rotary valves in engines of the kind referred to but, in all cases where such proposals have been tried out in practice, it has been found that defects appear after some hours of working. Usually these troubles are mainly due to the effects of carbonisation but, in any event they make the suggested constructions quite useless.

Intensive research has now shown that the defects of the known arrangements can be avoided by providing, on that side of the disc-shaped rotary valve which faces towards the combustion chamber of the engine, rotatable annular packing devices which are pressed against the said valve solely by the gas pressure and which, when the engine is working, are caused to rotate in consequence of the different peripheral speeds of the rotary valve acting upon the said annular packing devices. It is just because these annular packing devices are pressed against the rotary valves by gas pressure alone and not by spring pressure, as in the known constructions, that they are capable of rotary motion and can thus respond to those influences of the rotary valve which are due to the different peripheral speeds of the latter. Now when these packing devices are caused to rotate continuously so long as the engine is working, there is no longer any risk of carbon deposits forming between the packing surfaces and the casing or at the packing rings which are mounted in the said packing devices. On the contrary packing devices arranged according to the invention continue to function satisfactorily over long periods.

A further feature of the present invention consists in the fact that part of an annular packing device of the kind described which bears against the valve has two or more outwardly inclined or bevelled surfaces, which are successively brought into contact with the rotary valve in accordance with the temperature to which the packing device is heated. The reason for this construction is as follows:

When the internal combustion engine is started and the various parts thereof start to warm up, the packing device gives up its heat most rapidly at regions where it has a large surface area in contact with another mass. This would apply especially to the region where the packing device bears against the rotary valve, because its opposite end face is raised out of contact with the casing when the engine is working, by gas pressure in the combustion chamber. The result of thus preventing contact with a cooling mass is that the packing device heats up to a greater extent on the side next to the combustion chamber than on the side next to the rotary valve and is subject, therefore, to unequal radial expansion. As the engine heats up, after starting, that part of the packing device which is next to the combustion chamber expands in diameter to a greater extent than the part which is next to the rotary valve. If the packing device be made truly rectangular in cross section, the result of heating up after the engine is started is that the upper end of the packing device ceases to make surface contact with the valve. Only the outer edge of the packing device remains in contact with the valve and under such conditions the packing action is wholly inadequate. It has been found in practice with packing devices of the kind under consideration that packing contact over the entire end surface under operating conditions can only be expected after a long running-in period.

If, however, in accordance with the present invention two or more outwardly inclined surfaces be provided on the side of the packing device which comes next to the valve, the result is that as the packing device changes its shape during the running-in of the engine, one of the said inclined surfaces will, in any case, always be caused to bear against the rotary valve, according to the degree to which the packing device has been heated up and efficient packing is ensured.

Finally, another feature of the invention consists in providing, in addition to the above mentioned annular packing devices a further packing member in the form of a metallic packing ring 1. This latter is located in the casing of the internal combustion engine. Its packing surface bears against the outer circumference of the disc-shaped rotary valve, in the same plane as the packing surfaces of the first mentioned packing devices.

The invention is illustrated in the accompanying drawing and will now be more particularly described with reference thereto.

Fig. 1 shows the upper parts of an engine which may be assumed to include a multi-cylinder engine block and cylinder head assembly. For the purposes of the present invention, however, it is quite immaterial whether the engine has only one cylinder or more than one or whether, in the case of a multi-cylinder engine, the several cylinders are in line or are disposed radially ("star"-fashion) in V-formation or in any other way;

Figure 2 is an enlarged detail of a portion of Figure 1;

Figure 3 is a similar view showing a modification; and

Figure 4 is a further enlarged view of the modification shown in Figure 3.

The engine casing 1 (shown in the drawing as comprising a cylinder block with a cylinder head portion seated thereon) may be constructed in any desired way. A piston is indicated at 2. Admission and exhaust are controlled by a rotary valve 3 which, as usual, takes the form of a circular plate with openings 4 in it, corresponding to the ports 5 in the engine casing. The novel features of the arrangement reside in the provision and in the construction of the packing devices 6 and 7. The rotary valve may be actuated in any desired manner, for example it may be externally toothed, as at 8, to gear with a driving pinion (not shown). In multi-cylinder engines the gear teeth on the several rotary slide valves may mesh one with another, so that only one single driving pinion, at one end of the engine casing is required.

The packing devices 6 and 7 are shown on an enlarged scale in Fig. 2, which is diagrammatic. Each of the packing devices 6 is provided with packing rings 9 (like piston rings) which provide a gas seal around its lateral (peripheral surface) when the engine is working. Under working conditions the bottom and face of the packing device does not rest upon the casing 1: on the contrary the upper end face of this member is forced, by the pressure of the gases, into contact with the rotary valve 3. Owing to the differences in the peripheral velocity prevailing at the various points on the rotary valve where the packing device is in contact with it and owing, also, to the clearance provided between the packing device and the casing, the said packing device rotates freely when the rotary valve is rotated. The upper end face of the packing device is externally bevelled or chamfered.

On the left hand side of Fig. 2 one chamfer is shown, but on the right hand side of Figure 3 there are two, it being understood that not merely two surfaces but a plurality thereof may be present in any particular case. The action of this bevelling has already been described.

While the packing 7 is also indicated in Fig. 2 its shape can best be ascertained from Fig. 1. It surrounds the two ports 5 in the casing 1 and packs them from the outside. Its diameter, therefore is approximately commensurate with the external diameter of the rotary valve. It constitutes an additional packing, so that, in case any gases escape through the packing devices 6 or at the regions where these devices make contact with the rotary valve 3, they cannot, in any case, get out into the atmosphere or reach an adjoining cylinder. This additional packing is a highly important adjunct in the working of the engine.

We claim:

1. Packing for internal combustion engines having rotary disk valves, comprising packing rings on the side of the valve facing the combustion chamber and arranged around the inlet and outlet ports in the casing, the under surfaces of said packing rings constituting their greatest cross section, the entire said under surface being subjected to the internal pressure of the combustion chamber, said packing rings being mounted in said casing in readily rotatable relation, the upper surface of each packing ring which faces the valve and turns in contact with it, consisting of at least two relatively inclined surfaces, their inclination with respect to the axis of rotation of the packing rings being so arranged that they come successively into contact with the rotary disk valve according to the temperature to which the packing device is expanded by heat.

2. Packing for internal combustion engines having rotary disk valves, comprising packing rings on the side of the valve facing the combustion chamber and arranged around the inlet and outlet ports in the casing, the under surfaces of said packing rings constituting their greatest cross section, the entire said under surface being opposed to the internal pressure of the combustion chamber, said packing rings being mounted in said casing in readily rotatable relation, each packing ring having two or more outwardly inclined surfaces which come successively into contact with the rotary disk valve according to the temperature to which the packing device is expanded by heat.

3. Packing for internal combustion engines having rotary disk valves, comprising an annular packing device engaging the side of the valve which faces the combustion chamber, said annular packing device being provided with a plurality of concentric relatively inclined annular surfaces constructed and arranged to come successively into contact with said valve according to the temperature to which said annular packing device is expanded by heat.

4. Packing for internal combustion engines having rotary disk valves, comprising an annular packing device engaging the side of the valve which faces the combustion chamber and provided with a plurality of concentric relatively inclined surfaces constructed and arranged to come successively into contact with said valve according to the temperature to which said annular packing device is expanded by heat, and another annular packing device mounted in the engine casing and having a surface which bears against the outer circumference of said rotary disk valve in the same plane as said first mentioned packing device.

5. Packing for internal combustion engines having rotary disk valves, comprising packing rings on the side of the valve facing the combustion chamber and arranged around ports in the casing, said rings being provided with a plurality of relatively inclined annular surfaces constructed and arranged to come successively into contact with said valve according to the temperature to which said rings are expanded by heat.

6. Packing for internal combustion engines having rotary disk valves, comprising packing rings on the side of the valve facing the combustion chamber and mounted for rotation under the influence of the different peripheral speeds of said rotary disk valve, said rings being provided with concentric relatively inclined annular surfaces constructed and arranged to come successively into contact with said valve according to the temperature to which said rings are expanded by heat.

7. Packing for internal combustion engines having rotary disk valves comprising an annular packing device engaging the side of the valve which faces the combustion chamber, said annular packing device being provided with a plurality of concentric annular surfaces, the outer of said surfaces being inclined outwardly away from the valve, said surfaces being constructed and arranged to come successively into contact with said valve according to the temperature to which said annular packing device is expanded by heat.

WOLF-DIETRICH BENSINGER.
ROHDOLF JANSEN.
OTTO WETZOLD.